United States Patent
Wang

(10) Patent No.: US 12,432,668 B2
(45) Date of Patent: Sep. 30, 2025

(54) ENHANCED BEACON AND PROBE RESPONSES FOR LOW POWER TRANSMITTER CONFIGURATION

(71) Applicant: AT&T Intellectual Property I, L.P., Atlanta, GA (US)

(72) Inventor: Feng Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 650 days.

(21) Appl. No.: 17/745,926

(22) Filed: May 17, 2022

(65) Prior Publication Data

US 2023/0379840 A1   Nov. 23, 2023

(51) Int. Cl.

| | |
|---|---|
| H04W 52/36 | (2009.01) |
| H04L 5/00 | (2006.01) |
| H04W 72/044 | (2023.01) |
| H04W 72/0453 | (2023.01) |
| H04W 88/08 | (2009.01) |

(52) U.S. Cl.
CPC ......... *H04W 52/365* (2013.01); *H04L 5/0073* (2013.01); *H04W 72/0453* (2013.01); *H04W 72/0473* (2013.01); *H04W 88/08* (2013.01)

(58) Field of Classification Search
CPC .......... H04W 52/365; H04W 72/0453; H04W 72/0473; H04W 88/08; H04W 4/02; H04W 16/14; H04W 72/23; H04L 5/0073
USPC ........................................................ 455/143
See application file for complete search history.

(56) References Cited

U.S. PATENT DOCUMENTS

| | | | |
|---|---|---|---|
| 2020/0236558 A1* | 7/2020 | Damnjanovic | ....... H04W 74/04 |
| 2022/0210661 A1* | 6/2022 | Richards | ............. H04W 72/541 |

* cited by examiner

*Primary Examiner* — Eugene Yun
(74) *Attorney, Agent, or Firm* — Guntin & Gust, PLC; Louis Yang

(57) ABSTRACT

Aspects of the subject disclosure may include, for example, methods and apparatus to configure low power transmitters that operate in unlicensed 6 GHz spectrum in an effort to reduce the likelihood that the low power transmitters will cause interference to incumbent operators of fixed microwave links in the same 6 GHz spectrum. The low power transmitters may be any transmitter in the unlicensed spectrum, including for example, low power indoor access points, 5G small cells, and the like. Other embodiments are disclosed.

20 Claims, 15 Drawing Sheets

200A

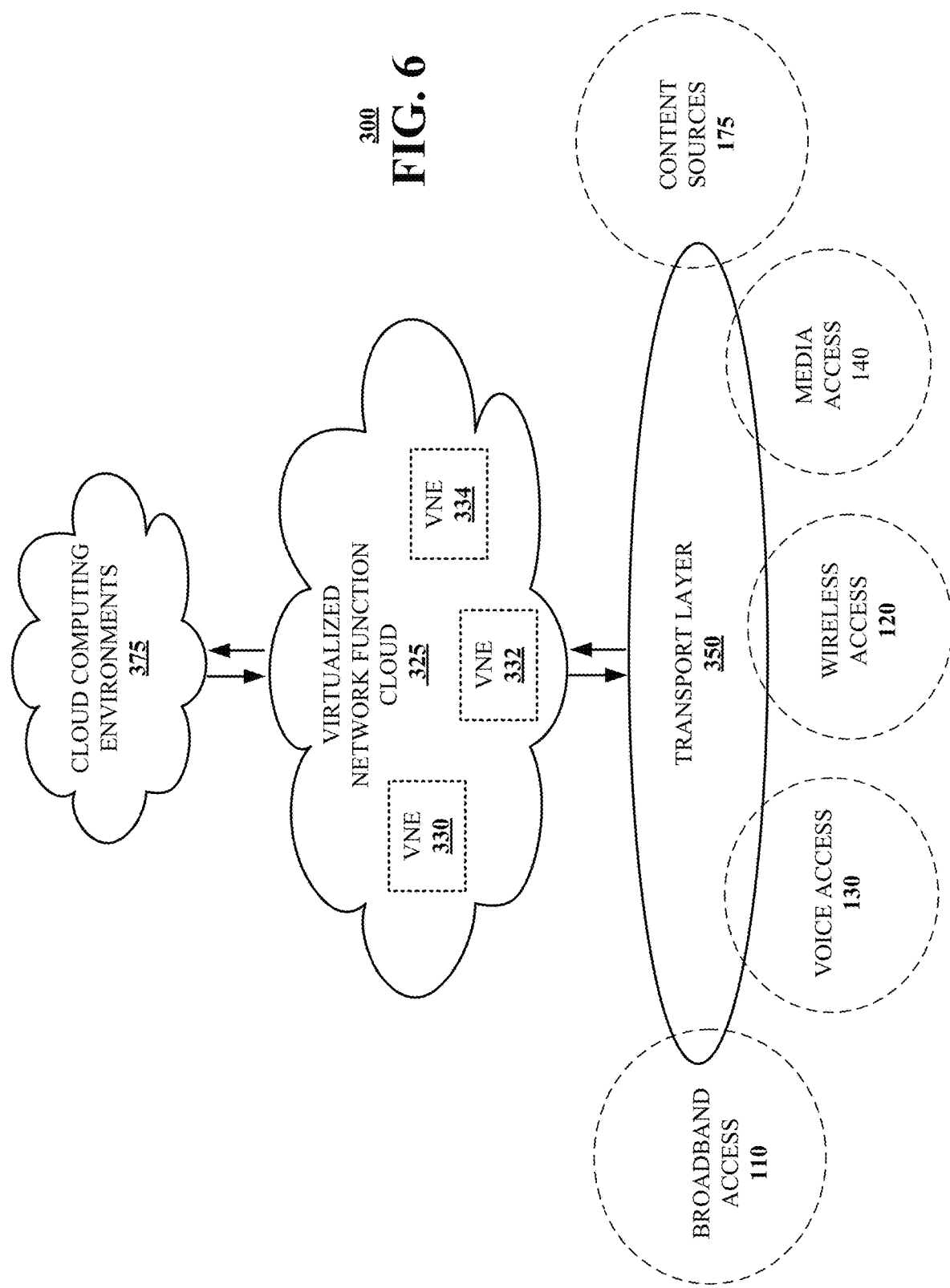

ENHANCED BEACON AND PROBE RESPONSES FOR LOW POWER TRANSMITTER CONFIGURATION

FIELD OF THE DISCLOSURE

The subject disclosure relates to configurations of low power indoor access points operating in unlicensed 6 GHz spectrum.

BACKGROUND

The Federal Communications Commission (FCC) recently approved operation rules for unlicensed use of 1.2 GHz of 6 GHz spectrum. The operation rules operate to protect incumbent licensed operators in the same spectrum by defining power limits and frequency coordination for different types of unlicensed users.

BRIEF DESCRIPTION OF THE DRAWINGS

Reference will now be made to the accompanying drawings, which are not necessarily drawn to scale, and wherein:

FIG. 6 is a block diagram illustrating an example, non-limiting embodiment of a virtualized communication network in accordance with various aspects described herein.

DETAILED DESCRIPTION

Figure 1:
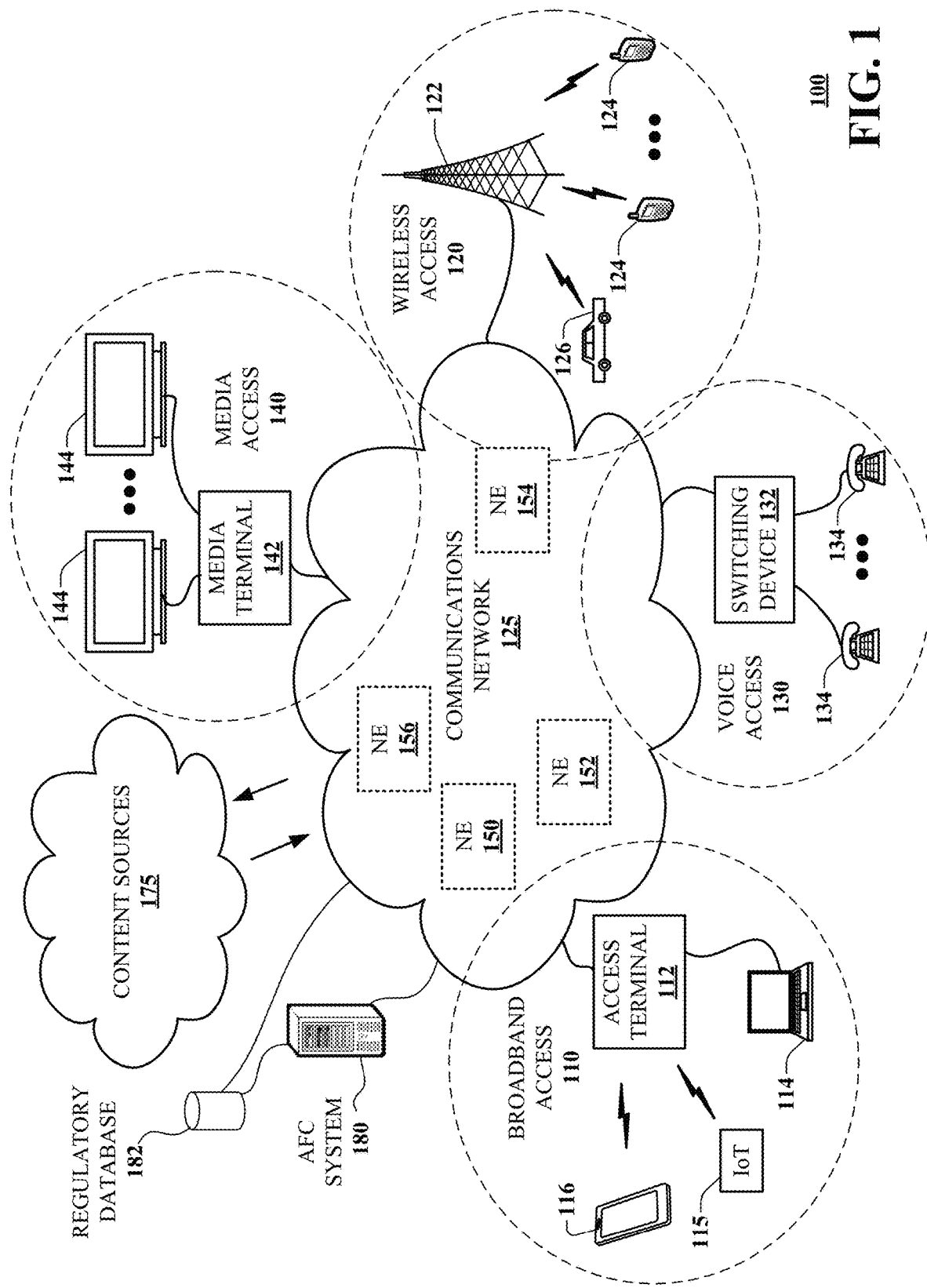
FIG. 1 is a block diagram illustrating an exemplary, non-limiting embodiment of a communications network in accordance with various aspects described herein.

The subject disclosure describes, among other things, illustrative embodiments for configuring low power transmitters in an effort to reduce or eliminate the likelihood of causing interference to incumbent operators of fixed microwave links. Other embodiments are described in the subject disclosure.

One or more aspects of the subject disclosure include a device having a processing system including a processor, and a memory that stores executable instructions that, when executed by the processing system, facilitate performance of operations. The operations may include providing geolocation data of a standard power access point to an automated frequency coordination (AFC) system; receiving, at the standard power access point, data identifying at least one frequency channel available for use by the standard power access point; and periodically transmitting, by the standard power access point, the data identifying the at least one frequency channel in a Wi-Fi beacon.

One or more aspects of the subject disclosure include a non-transitory machine-readable medium, comprising executable instructions that, when executed by a processing system including a processor, facilitate performance of operations. The operations may include providing geolocation data of a standard power access point to an automated frequency coordination (AFC) system; receiving, at the standard power access point, data identifying at least one frequency channel available for use by the standard power access point; and periodically transmitting, by the standard power access point, the data identifying the at least one frequency channel in a Wi-Fi beacon.

One or more aspects of the subject disclosure include method, comprising: providing, by a standard power access point including a processor, geolocation data of the standard power access point to an automated frequency coordination (AFC) system; receiving, by the standard power access point, data identifying at least one frequency channel available for use by the standard power access point; and periodically transmitting, by the standard power access point, the data identifying the at least one frequency channel in a Wi-Fi beacon.

Still further aspects of the subject disclosure include receiving a probe from a transmitter; and providing a probe response to the transmitter, wherein the probe response includes the data identifying the at least one frequency channel. In some aspects, the transmitter may comprise a low power indoor transmitter such as a residential gateway that may include a Wi-Fi access point or a 5G small cell.

In some aspects, the standard power access point operates using unlicensed spectrum in a 6 GHz band, and the at least one frequency channel comprises a list of frequency channels to reduce or eliminate a possibility of interference to licensed operators using the 6 GHz band.

Some aspects include further operations such as receiving a power limit from the AFC system; and transmitting the power limit in the Wi-Fi beacon. The receiving the power limit may include receiving a power limit for each of the at least one frequency channel available for use; and the transmitting the power limit in the Wi-Fi beacon may include transmitting the power limit for each of the at least one frequency channel available for use in the Wi-Fi beacon.

In some aspects the receiving data identifying the at least one frequency channel available for use comprises receiving data identifying a plurality of frequency channels available for use and the transmitting the data identifying the at least one frequency channel in the Wi-Fi beacon comprises transmitting the data identifying the plurality of frequency channels in the Wi-Fi beacon. These and other aspects are further described below.

Referring now to FIG. 1, a block diagram is shown illustrating an example, non-limiting embodiment of a system 100 in accordance with various aspects described herein. For example, system 100 can facilitate in whole or in part the configuration of low power indoor access points operating in unlicensed 6 GHz spectrum. In particular, a communications network 125 is presented for providing broadband access 110 to a plurality of data terminals 114, IoT devices, 115, mobile devices 116, etc., via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT), Wi-Fi access point, and/or other access terminal. The data terminals 114, IoT devices 115, and mobile devices 116 can include personal computers, laptop computers, netbook computers, tablets, smartphones, or other computing devices along with digital subscriber line (DSL) modems, data over coax service interface specification (DOCSIS) modems or other cable modems, Fiber modems, a wireless modem such as a 4G, 5G, or higher generation modem, an optical modem and/or other access devices. In some embodiments, access terminal 112 may include a Wi-Fi access point. For example, an 802.11 standard based Wi-Fi AP, operating at 2.4, 5 and 6 GHz, may be integrated with the modems at subscriber location. For example, in some embodiments, access terminal 112 may include a standard power (indoor or outdoor) Wi-Fi access point, or may include a low power indoor (LPI) Wi-Fi access point operating at 6 GHz spectrum.

In various embodiments, the base station or access point 122 can include a 4G, 5G, or higher generation base station, an access point that operates via an 802.11 standard such as 802.11n, 802.11ac, 802.11ax, 802.11be or other wireless access terminal. The mobile devices 124 can include mobile phones, e-readers, tablets, IoT terminals, phablets, wireless modems, and/or other mobile computing devices.

In various embodiments, access point 122 may be an access point that communicates with associated client devices (e.g., mobile devices 124, vehicle 126, etc.) over unlicensed 6 GHz spectrum. For example, in some embodiments, access point 122 may be a standard power (indoor or outdoor) Wi-Fi access point, or may be a low power indoor (LPI) Wi-Fi access point. Various embodiments support the configuration of both standard power access points and LPI access points in a manner that potentially reduces interference to other, incumbent, users that operate in the same 6 GHz spectrum.

Automated Frequency Coordination (AFC) system 180 includes one or more devices (e.g., computers, servers, network elements, edge nodes, cloud resources, etc.) capable of communicating either directly or indirectly with wireless access points 120 and regulatory database 182. In some embodiments, AFC system 180 is implemented by one or more network elements within communications system 125. In other embodiments, AFC system 180 is implemented outside communications network 125.

In some embodiments, regulatory database 182 includes information related to incumbent users of 6 GHz spectrum. For example, regulatory database 182 may include information describing location and operating parameters of licensed equipment such as transmitters and receivers. Examples include, but are not limited to, GPS coordinates, frequency channels, power levels, antenna heights and patterns, and the like. In some embodiments, regulatory database 182 may be a National Regulatory Authority (NRA) database (e.g., ULS, Equipment Authorization Database, etc.). In some embodiments, regulatory database 182 includes incumbent licensing information. Also in some embodiments, regulatory database 182 includes equipment authorization records.

In operation, a standard power access point may provide information describing its own location and operational characteristics to AFC system 180, which then consults regulatory database 182 to determine a frequency channel, or channels, and power limit for operation of the standard power access point in an effort to reduce or eliminate the possibility of the standard power access point causing interference to any of the operators described in regulatory database 182. In some embodiments, AFC system 180 employs Incumbent Licensing Information acquired through regulatory database 182 (e.g., NRA Databases) to calculate the maximum power at each frequency available for standard power access points operating at a particular location.

Further, in some embodiments, frequency channels and power limits for use by LPI access points may also be determined to reduce or eliminate the possibility of LPI access points causing interference to operators described in regulatory database 182. For example, in some embodiments, communications network 125 may include a network element that provides LPI configuration management services. These LPI configuration management services may provide a gateway to the AFC system 180 to retrieve and/or determine channel and/or power limit information that may be used to configure one or more LPI access points. Further, these LPI configuration services may communicate directly with regulatory database 182 (bypassing AFC system 180) to retrieve information regarding incumbent 6 GHz operators, and determine channel and power limit information for the one or more LPI access points without consulting AFC system 180.

In some embodiments, LPI access points may determine channel and/or power limit configuration information by listening to beacons transmitted by standard power access points, where the beacons include information provided to the standard power access points by AFC system 180. In still further embodiments, LPI access points may probe one or more standard power access points and receive a probe response that includes information provided to the standard power access points by AFC system 180. These and other embodiments are described further below.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. In various embodiments, media terminal 142 may be integrated with an access terminal such as access terminal 112, Wi-Fi Access Points (2.4 GHz, 5 GHz, 6 GHz), such as a standard power access point or a low power indoor access point. The display devices 144 can include televisions with or without a set top box, personal computers and/or other display devices. In some embodiments, display devices 144 may include a Wi-Fi client device capable of accessing media terminal 142 using a Wi-Fi connection.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
FIG. 2A is a diagram illustrating example, non-limiting embodiments of microwave links in accordance with various aspects described herein.

FIG. 2A is a diagram illustrating example, non-limiting embodiments of microwave links in accordance with various aspects described herein. The point-to-point microwave links 200A shown in FIG. 2A are an example representation of existing, licensed, terrestrial uses of the 6 GHz band. For example, each endpoint of the links 200A may include a transmitter and/or receiver at a particular location and height, with a particular power output and antenna pattern. In some embodiments, the regulatory database 182 may include records for each transmitter and/or receiver, as well as records for each link that includes pertinent information such as frequency channel, power, and the like. Existing licensed microwave links in the 6 GHz band are currently used by many different incumbent services operators for many different types of services, such as for Fixed Satellite Services (FSS), P-P Fixed Services (FS) and Mobile services supporting utilities, public safety, and wireless backhaul.

Various embodiments described herein provide for configuring devices engaged in unlicensed use of the same spectrum as that used by the operators represented in FIG. 2A. For example, various embodiments provide apparatus and methods to configure Wi-Fi access points that utilize the same 6 GHz spectrum as the links shown in FIG. 2A, where the configuration includes channel selection and/or power limits that protect incumbent microwave links (such as those represented in FIG. 2A) from potential interference caused by the unlicensed use.

Various embodiments described herein include two classes of transmitters that utilize unlicensed 6 GHz spectrum that is also used by the microwave links 200A. Standard power transmitters are required to communicate with an AFC system to receive frequency channel(s) and power limits that the AFC system determines will not cause harmful interference to operations of incumbent operators as represented by links 200A. Low Power Indoor (LPI) access points are not required to communicate with an AFC system to receive channel and power limit information; however, in certain situations (e.g., close proximity to incumbent link receiver), LPI access points may be able to cause interference to the incumbent microwave links. Various embodiments described herein provide various levels of control over LPI channel and power selection in an effort to reduce the possibility of interference to incumbent operator microwave links. Further, some embodiments described herein provide for configuration of transmitters (e.g., channel selection, power limits, etc.) that are not required to coordinate with an AFC system by FCC rules, wherein the configuration makes use of information from at least one regulatory database also utilized by an AFC system to coordinate frequency usage in transmitters that are required to coordinate with an AFC system.

Figures 2B, 2C, 2D:
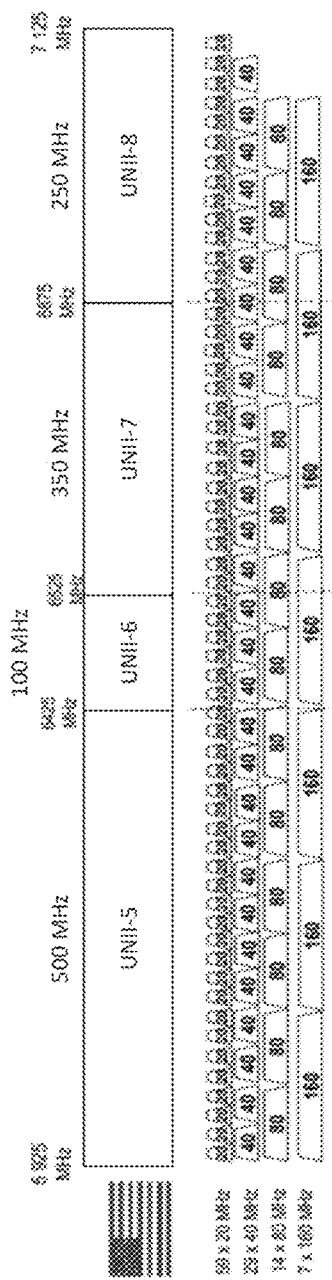
FIG. 2B is a diagram illustrating unlicensed spectrum in a 6 GHz band in accordance with various aspects described herein.
FIG. 2C is a diagram illustrating standard power access point power limits when operating in unlicensed spectrum in a 6 GHz band in accordance with various aspects described herein.
FIG. 2D is a diagram illustrating low power indoor access point power limits when operating in unlicensed spectrum in a 6 GHz band in accordance with various aspects described herein.

FIG. 2B is a diagram illustrating unlicensed spectrum in a 6 GHz band in accordance with various aspects described herein. The Federal Communications Commission (FCC) formally approved the 6 GHz rules of operation in April 2020, and the rules took effect in July of the same year. The rules added an additional total bandwidth of 1.2 GHz of 6 GHz spectrum for unlicensed use, to be shared with incumbent fixed microwave link operators in the same band (represented by links 200A, FIG. 2A). As shown in FIG. 2B, the additional spectrum is identified in four different bands: UNII-5, UNII-6, UNII-7, and UNII-8. As used herein, the term "unlicensed 6 GHz spectrum" refers to all or any portion of the spectrum shown in FIG. 2B.

According to the rules for unlicensed operation, incumbent fixed microwave links must be protected by following indoor and outdoor operation rules. The rules for standard power use are summarized in FIG. 2C, and the rules for LPI use are summarized in FIG. 2D.

FIG. 2C is a diagram illustrating standard power access point power limits when operating in unlicensed spectrum in a 6 GHz band in accordance with various aspects described herein. As shown in FIG. 2C, standard power access point operations are limited to bands UNII-5 and UNII-7 (500 MHz+350 MHz) and must use an AFC system for channel selection. Maximum Effective Isotropic Radiated Power (EIRP) of standard power access points is limited to 36 dBm, and Maximum EIRP Power Spectral Density is limited for various band sizes. Additional EIRP limitations may be specified as a function of radiation angle (e.g., no more than 21 dBm EIRP 30° above the horizon). In addition, clients that are associated to standard power access points have maximum EIRP and power spectral densities that are 6 dB lower than the standard power access point. As an example, referring back to FIG. 1, a standard power access point such as access point 120 (or a standard power AP in 110, 140 environments) may be limited to a maximum EIRP of 36 dBm, and an associated client such as mobile device 124 or vehicle 126 may be limited to a maximum EIRP of 30 dBm.

In addition to the power limitations represented by FIG. 2C, standard power access points must also be capable of determining their location in two or three dimensions (e.g., latitude, longitude, height) and must communicate with an AFC system periodically to request a list of available channels. For example, in some embodiments, a standard power access point may provide its location to an AFC system every 24 hours and request a list of available channels.

FIG. 2D is a diagram illustrating low power indoor access point power limits when operating in unlicensed spectrum in a 6 GHz band in accordance with various aspects described herein. LPI access points are differentiated from standard power access points in multiple ways. For example, LPI access points must operate indoors and can't be operated by a battery. Also for example, LPI access points require proper labelling, must have integrated antennas, and must not have a weatherproof case.

As shown in FIG. 2D, LPI access point operations can utilize the entire unlicensed 6 GHz spectrum including bands UNII-5, UNII-6, UNII-7, and UNII-8. Maximum Effective Isotropic Radiated Power (EIRP) of LPI access points is limited based on band size, and Maximum EIRP Power Spectral Density is limited to 5 dBm/MHz. In addition, clients that are associated to LPI access points have maximum EIRP and power spectral densities that are 6 dB lower than the LPI access point. As an example, referring back to FIG. 1, an LPI access point (e.g., access point 120 when operating indoors as an LPI access point, or in the 110 and 140 environments) may be limited to a maximum EIRP density of 5 dBm/MHz, and an associated client such as mobile device 124 may be limited to a maximum EIRP density of −1 dBm/MHz.

Interference to incumbent operations from unlicensed operations (e.g., standard power and LPI access points) could potentially have a widespread negative impact to many services including essential services (e.g., emergency response and recovery, electricity, heat, water, transportation, etc.). Because, by FCC rule, the LPI APs are allowed to select any channel in the 1.2 GHz of available spectrum in the 6 GHz band, it is possible that an LPI access point may choose a channel licensed to an incumbent operator to be used in the same area at the same time, thereby increasing the possibility of unlicensed operation causing interference to licensed operation. While by FCC rule, only standard power access points are required to use an AFC system for channel selection, various embodiments described herein provide services in support of LPI access point channel selection and power limits to reduce the possibility of LPI access points causing interference to incumbent operations.

Figure 2E:
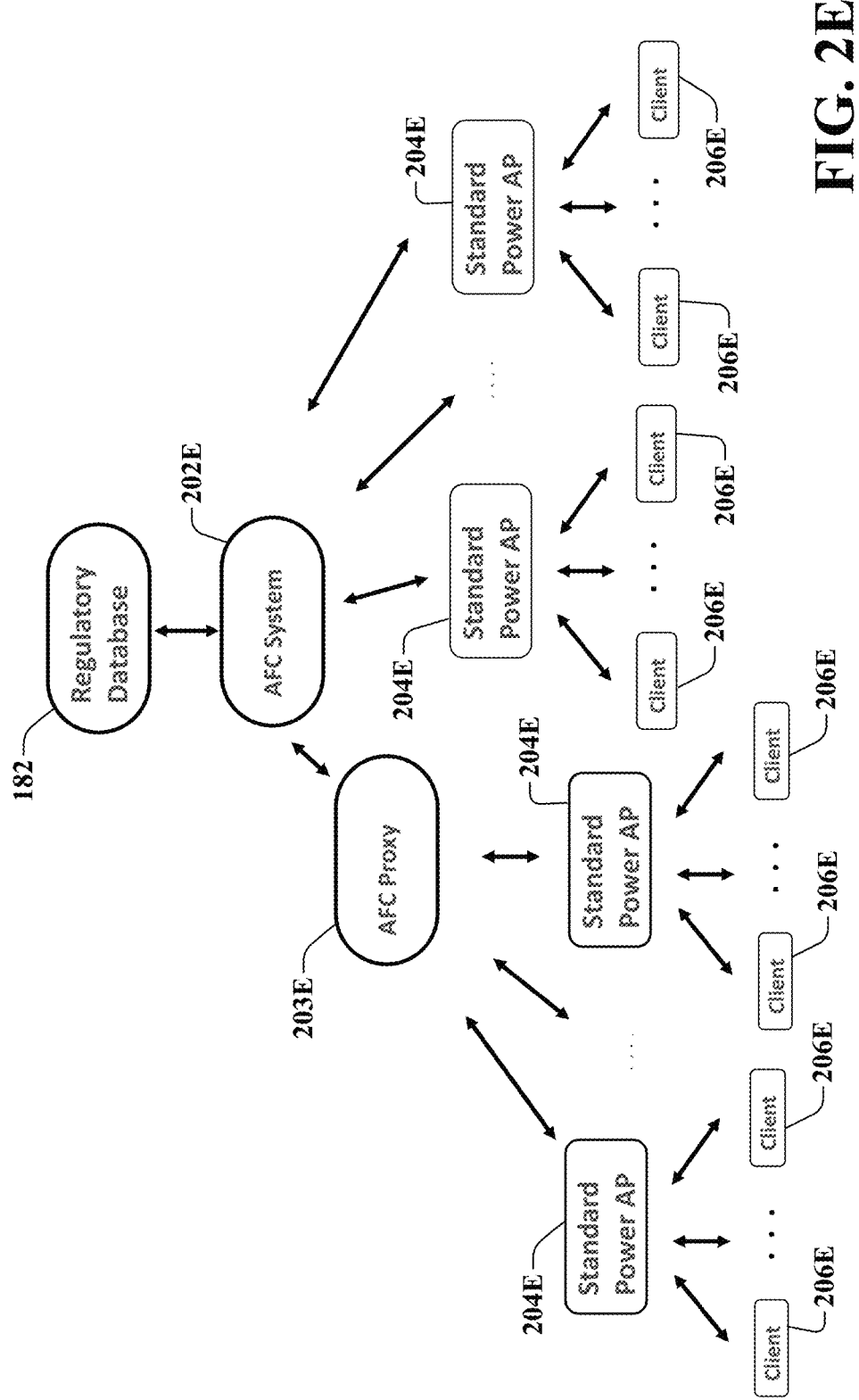
FIG. 2E is a diagram illustrating an Automated Frequency Coordination (AFC) system architecture in accordance with various aspects described herein.

FIG. 2E is a diagram illustrating an Automated Frequency Coordination (AFC) system architecture in accordance with various aspects described herein. FIG. 2E shows regulatory database 182, AFC system 202E, AFC proxy 203E, standard power access points 204E, and client devices 206E. Standard power access points are an example of a type of transmitter required to coordinate frequency usage using an AFC system. For example, in various embodiments, standard power access point channel selection is controlled by the Automated Frequency Coordination (AFC) system 202E. To protect incumbent 6 GHz operations from RF interference, the FCC requires the use of an AFC for standard power operations. The standard power access point, or an access point controller acting as proxy 203E, sends the access point location, antenna height, FCC ID, device serial number, etc. to an AFC system 202E. The AFC system checks with the fixed microwave link regulatory database 182 (synchronized with the FCC ULS database) and calculates the potential interference level to the licensed users. The AFC system 202E returns a list of one or more allowable channels and output powers, from which the access point can choose to operate. Standard power access points must check in with the AFC system periodically (e.g., every 24 hours) to update the channel list and act accordingly. In some embodiments, a standard power access point must stop transmitting in the unlicensed 6 GHz band if it loses contact with the AFC system.

Regulatory database 182 includes incumbent data about 6 GHz fixed microwave links that include licensing information such as transmitter and receiver locations, frequencies, bandwidths, polarizations, transmitter EIRP, antenna height, the type of equipment authorized, etc. AFC systems 202E communicate with the regulatory database 182 and employ the licensed incumbent information obtained therefrom to calculate the maximum power at each frequency available for standard power access point devices operating at a particular location. Standard power access points 204E have, or are able to obtain, geo-location data (access point coordinates and antenna height), and provide it to AFC system 202E directly or through proxies 203E at power up and every 24 hours, to query the AFC system to get a list of available frequency ranges in which it is permitted to operate and the maximum permissible power (for standard power access points 204E) in each frequency range without causing harmful interference to the incumbent fixed microwave links.

Figure 3A:
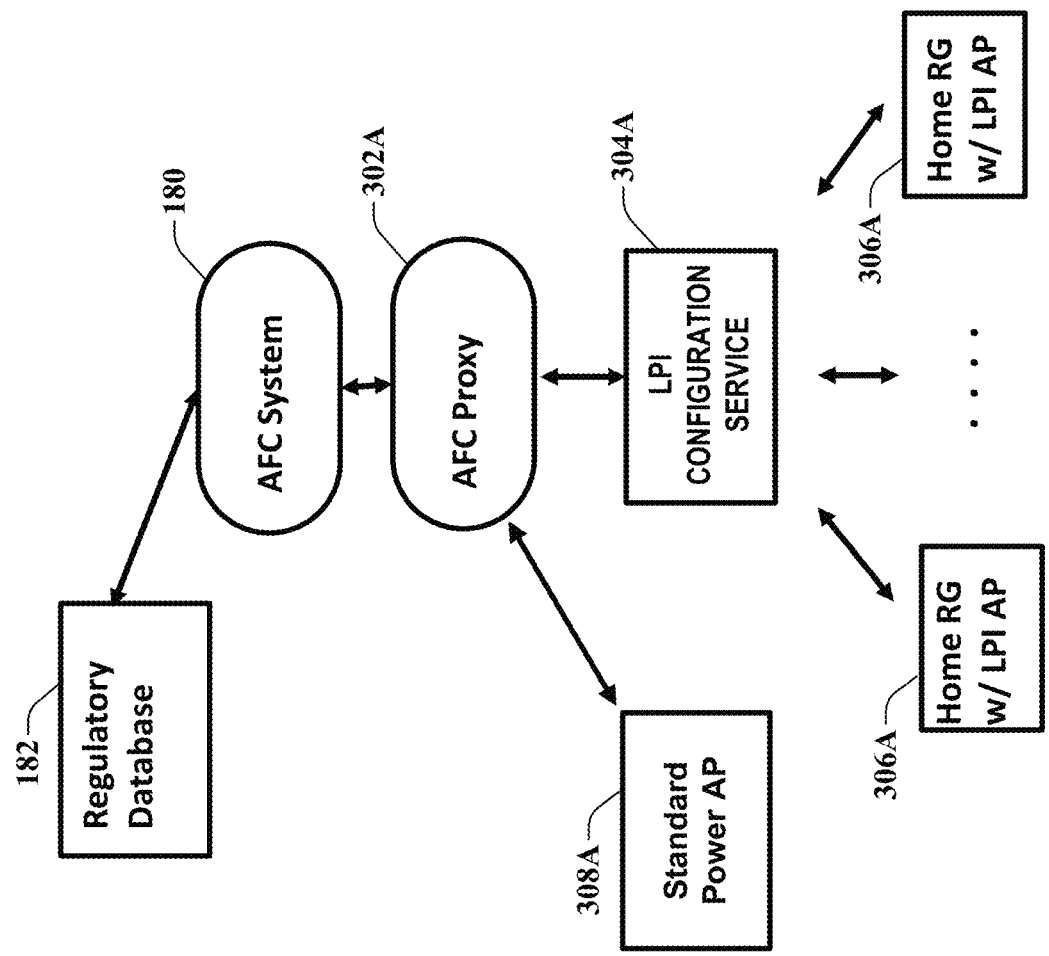
FIG. 3A is a diagram illustrating remote management services to provide low power access point configuration in accordance with various aspects described herein.

FIG. 3A is a diagram illustrating remote management services to provide low power access point configuration in accordance with various aspects described herein. LPI configuration service 304A is a service provided to support the configuration of LPI devices that operate in unlicensed 6 GHz spectrum, such as residential gateways with LPI access points 306A. Residential gateways with LPI access points 306A are examples of low power transmitters that are not required to coordinate frequency usage with an AFC system. LPI configuration service 304A may be operated by a broadband services provider, such as the operator of communications network 125 (FIG. 1). In some embodiments, LPI configuration service 304A may be implemented using a network element, such as those shown and described with reference to the included figures. Also in some embodiments, LPI configuration service 304A may be implemented by a third party, or may be a service offered by a cloud service provider.

In some embodiments, residential gateways 306A are provided to end users (broadband customers) by broadband providers, and in other embodiments, residential gateways (or portions thereof) may be provided by the end users. For example, a broadband provider may provide the services described with respect to LPI configuration services 304A, and may also provide residential gateways 306A to broadband customers. Residential gateways 306A may include a transmitter that operates in unlicensed 6 GHz spectrum. For example, one or more residential gateways 306A may include a Wi-Fi 6E LPI access point, or may include a 5G small cell that includes a 6 GHz transmitter. In general, residential gateways 306A may include any type of transmitter useful for any purpose, where the transmitter is capable of transmitting in unlicensed 6 GHz spectrum. In some embodiments, the residential gateway and the LPI transmitter may be separate devices. For example, the residential gateway may be a modem provided to a broadband customer by a broadband services provider, and the LPI transmitter may be a Wi-Fi 6E LPI access point purchased separately by the broadband customer.

In operation, LPI configuration service 304A communicates with AFC system 180 through AFC proxy 302A on behalf of the LPI transmitters included in residential gateways 306A. LPI configuration service 304A gathers and provides information used to query AFC system 180 for frequency channel(s) and/or power limit(s), and then provides those channels and power limits to the LPI transmitters included in residential gateways 306A.

Because the AFC provided channel(s) and power limit(s) are for the standard power AP(s), the LPI configuration service 304A may employ a translation function to determine the proper channel(s) and power limit(s) for the LPI AP(s). For example, LPI configuration service 304A may receive frequency channel information relating to channels in UNII-5 and UNII-7 from the AFC system, and may employ a channel selection algorithm that considers the frequency channel information relating to channels in UNII-5 and UNII-7 received from the AFC system as well as frequency channels in UNII-6 and UNII-8. Accordingly the final frequency channel recommendation may be a result of an evaluation of the whole 6 GHz band, and not just the channel(s) received from the AFC system. In some embodiments, the AFC returned channels may be given a higher weight for selection in the channel selection algorithm, and in other embodiments, they are not.

In some embodiments, the location of residential gateways (and the location of LPI transmitters are known to broadband operators. For example, in some embodiments, when a broadband operator provisions a customer, the operator sends the residential gateway to a customer's address and that address becomes the location of the residential gateway. Also for example, in some embodiments, when a broadband operator authenticates a residential gateway, the broadband operator may collect location information. The location information may be provided by a customer interacting with the gateway, by IP address(es) known to the operator, or by location generating circuitry (e.g., GPS receiver) in the residential gateway.

In some embodiments, the LPI configuration service 304A combines the location information with other LPI information (e.g., models, operating power levels, antenna parameters, etc.), and provides it to AFC Proxy 302A. AFC Proxy 302A may communicate with many instances of standard power access points 308A and LPI configuration service 304A to reduce the number of separate connections between AFC system 180 and devices requesting AFC system services.

In some embodiments, AFC proxy 302A submits the information received from LPI configuration service 304A to AFC system 180 in the same manner that it submits information received from standard power access points 308A and communicates with the AFC system 180 to request channels for both standard power access points 308A and LPI access points. Information received by AFC proxy 302A from AFC system 180 is then provided to the requesting entity (e.g., standard power access point 308A or LPI configuration service 304A.

In some embodiments, LPI configuration service 304A further analyzes the information received from the AFC proxy. For example, in some embodiments, LPI configuration service 304A may receive a list of frequency channels and associated power limits from AFC proxy 302A and may modify the list of frequency channels and associated power limits prior to providing them to the requesting home residential gateway 306A. In some embodiments, LPI configuration service 304A determines a channel recommendation by selecting one of the frequency channels identified in the list provided by AFC system 180, and provides data identifying the selected channel to the home residential gateway, effectively commanding the home residential gateway to use the channel selected by LPI configuration service 304A. Also in some embodiments, LPI configuration service 304A determines a channel recommendation by selecting a frequency channel not identified in the list provided by AFC system 180, and provides data identifying the selected channel to the home residential gateway. Further, in some embodiments, LPI configuration service 304A may provide a residential gateway 306A with the power limit associated with the selected channel, and in other embodiments, LPI configuration service 304A may modify the power limit (e.g., reduce) associated with the selected channel, and provide the modified power limit to the home residential gateway 306A.

The various embodiments described herein provide methods and apparatus for improving LPI AP channel selection in a manner that provides better protection to incumbent microwave links without necessarily adding any new hardware cost. For example, in some embodiments, the various embodiments may be implemented through software modifications in AFC proxy 302A, LPI configuration service 304A, and home residential gateways 306A.

Figure 3B:
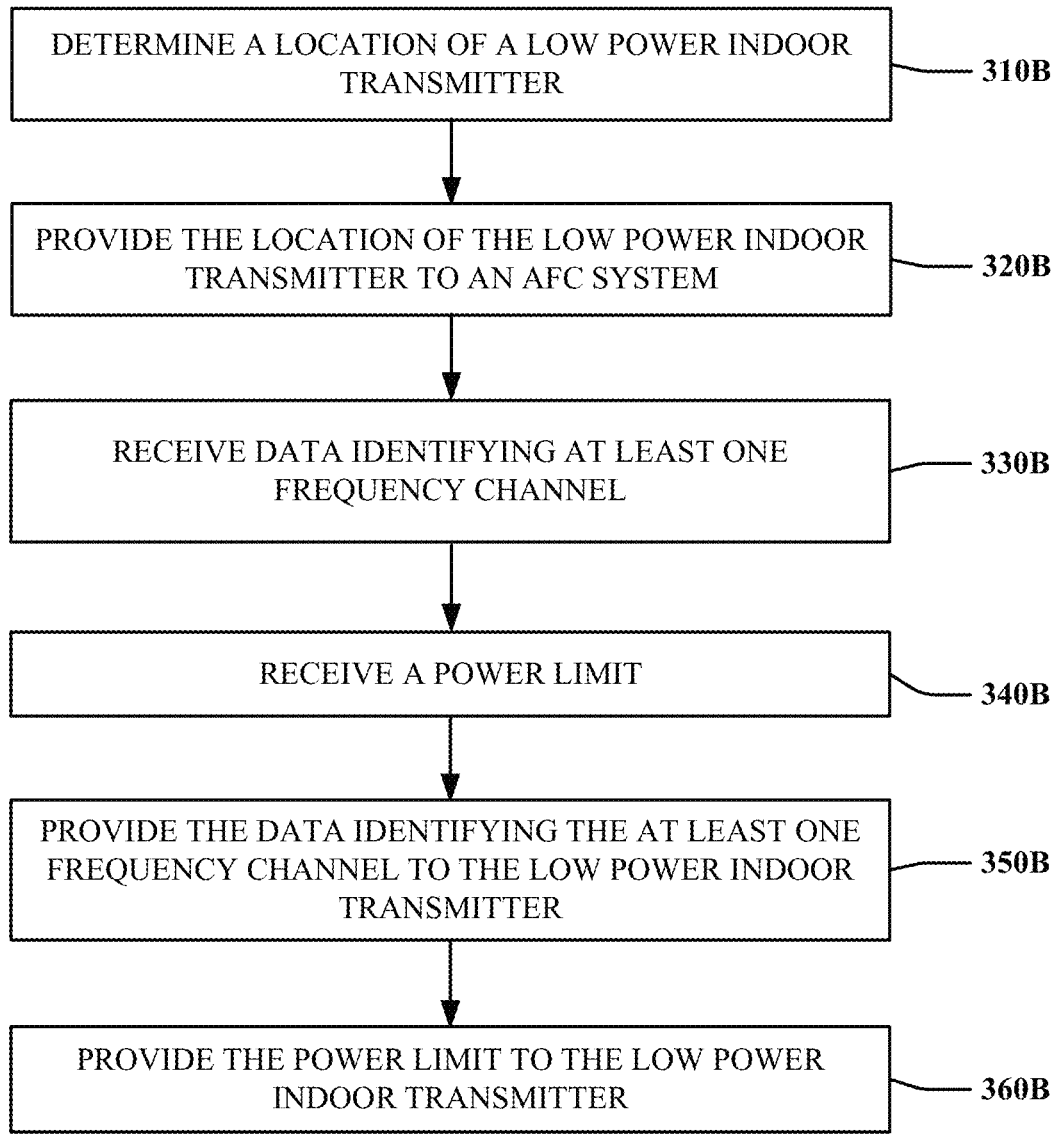
FIG. 3B depicts an illustrative embodiment of a method in accordance with various aspects described herein.

FIG. 3B depicts an illustrative embodiment of a method in accordance with various aspects described herein. At 310B of method 300B, a location of a LPI transmitter is determined. The LPI transmitter may be any transmitter that is considered to be a low power indoor transmitter that uses unlicensed 6 GHz spectrum. Examples include, but are not limited to, LPI indoor Wi-Fi access points, home residential gateways that include an LPI transmitter, 5G small cells that utilize unlicensed 6 GHz spectrum, and the like. In some embodiments, the location of the LPI transmitter location is determined in response to receiving a request from the LPI transmitter. The request may be a request for frequency channel information, power limit information, authentication, provisioning, or any other type of request from an LPI transmitter.

In some embodiments, the location of an LPI transmitter is determined by a LPI configuration service such as LPI configuration service 304A (FIG. 3A). In these embodiments, the location may be determined by accessing location data stored in a broadband customer's user data. For example, a customer record maintained by the broadband service provider may include a home address for the customer, and the home address may be determined to be the location of the LPI transmitter. Also in these embodiments, the location data may be determined using network information such as one or more IP addresses known to the service provider, or may be provided by a broadband customer during registration, provisioning, or authentication of the LPI transmitter. In still further embodiments, the location of the LPI transmitter may be provided by the LPI transmitter itself, or by a device that is collocated with the LPI transmitter. For example, in some embodiments, an LPI transmitter may include the ability to determine its own location (e.g., may include a GPS receiver), or may be in communication with a collocated device that is able to determine location (e.g., a computer or router that includes access to location information).

At 320B, the LPI transmitter location determined at 310B is provided to an AFC system. In some embodiments, this corresponds to an LPI configuration service providing the LPI transmitter location directly to an AFC system, or to an AFC proxy such as AFC proxy 302A (FIG. 3A). In various embodiments, the LPI transmitter location is combined with other LPI identifying information prior to providing it to the AFC system. For example, in some embodiments, additional identifying information is provided to the AFC system such that the AFC system can process the request in the same manner as processing a request from a standard power access point. For example, in some embodiments, an AFC system may not know whether it is processing a request from a standard power access point (e.g., standard power access point 308A, FIG. 3A) or from an LPI configuration service (e.g., LPI configuration service 304A, FIG. 3A).

At 330B, data identifying at least one frequency channel is received. In some embodiments, at 340B, data identifying at least one power limit is also received. For example, each frequency channel may have a particular power limit associated with it. The power limit may be the maximum limit allowed by FCC rule, or may be a lower power limit. In some embodiments, the apparatus performing method 300B may modify the data identifying the at least one frequency channel (and/or associated power limits) prior to providing the data to the LPI transmitter. For example, an LPI configuration service may determine a recommended channel by selecting one frequency channel from a list of frequency channels received from an AFC system, or by selecting a frequency channel not in the list received from the AFC system (e.g., a channel in UNII-6 or UNII-8. Also for example, an LPI configuration service may modify a power limit received from an AFC system. The LPI configuration service may select a frequency channel and/or modify a power limit based on any criteria. For example, in some embodiments, an LPI configuration service may modify a power limit based on the type of device, type of service being provided, number or type of client devices associated with the LPI transmitter, etc.

At 350B, the data identifying the at least one frequency channel is provided to the LPI transmitter. In some embodiments, at 360B, one or more power limits are also provided to the LPI transmitter. In some embodiments, this corresponds to an LPI configuration service such as LPI configuration service 304A (FIG. 3A) providing the data to one or more home residential gateways 306A (FIG. 3A). In some embodiments, the data provided to the LPI transmitter may be data as received from the AFC system (e.g., a list of channels), or may be data as modified by the LPI configuration service (e.g., a selected channel, a recommended channel, or a modified power limit). For example, in some embodiments, the LPI configuration service may coordinate the selection of frequency channel and/or power limit among a group of LPI transmitters based on location/distance and/or history of interference.

While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4A:
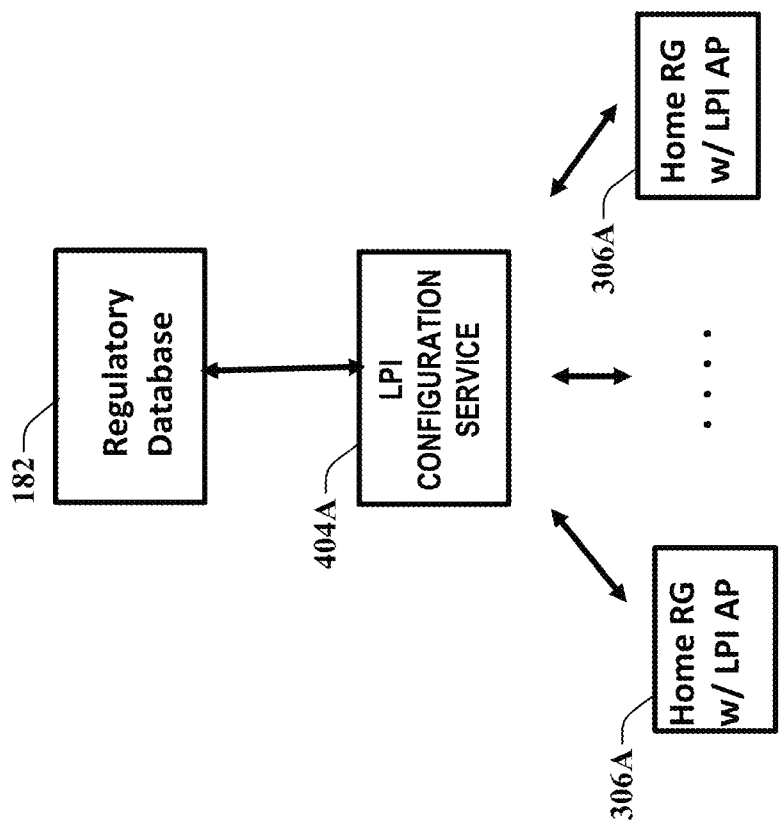
FIG. 4A is a diagram illustrating remote management services to provide low power access point configuration in accordance with various aspects described herein.

FIG. 4A is a diagram illustrating remote management services to provide low power access point configuration in accordance with various aspects described herein. LPI configuration service 404A is a service provided to support the configuration of LPI devices that operate in unlicensed 6 GHz spectrum, such as residential gateways with LPI access points 306A. LPI configuration service 404A may be operated by a broadband services provider, such as the operator of communications network 125 (FIG. 1). In some embodiments, LPI configuration service 404A may be implemented using a network element, such as those shown and described with reference to the included figures. Also in some embodiments, LPI configuration service 404A may be implemented by a third party, or may be a service offered by a cloud service provider. In some embodiments, LPI configuration service 404A includes the functionality of LPI configuration service 304A (FIG. 3A). In some embodiments, LPI configuration Service 404A can be in the cloud, whereas the residential gateway and Wi-Fi AP are at a customer's indoor location. LPI configuration service 404A is a logical function which can be physically located in any part of the communication networks, in the cloud, or in the same box as the residential gateway and/or LPI access point.

In some embodiments, residential gateways 306A are provided to end users (broadband customers) by broadband providers, and in other embodiments, residential gateways (or portions thereof) may be provided by the end users. For example, a broadband provider may provide the services described with respect to LPI configuration services 404A, and may also provide residential gateways 306A to broadband customers. Residential gateways 306A may include a transmitter that operates in unlicensed 6 GHz spectrum. For example, one or more residential gateways 306A may include a Wi-Fi 6E LPI access point, or may include a 5G small cell that includes a 6 GHz transmitter. In general, residential gateways 306A may include any type of transmitter useful for any purpose, where the transmitter is capable of transmitting in unlicensed 6 GHz spectrum. In some embodiments, the residential gateway and the LPI transmitter may be separate devices. For example, the residential gateway may be a modem provided to a broadband customer by a broadband services provider, and the LPI transmitter may be a Wi-Fi 6E LPI access point purchased separately by the broadband customer.

In some embodiments, the location of residential gateways (and the location of LPI transmitters are known to broadband operators. For example, in some embodiments, when a broadband operator provisions a customer, the operator sends the residential gateway to a customer's address and that address becomes the location of the residential gateway. Also for example, in some embodiments, when a broadband operator authenticates a residential gateway, the broadband operator may collect location information. The location information may be provided by a customer interacting with the gateway, by IP address(es) known to the operator, or by location generating circuitry (e.g., GPS receiver) in the residential gateway.

In operation, LPI configuration service 404A communicates with regulatory database 182 to determine frequency channel(s) and power limit(s) on behalf of the LPI transmitters included in residential gateways 306A. In some embodiments, LPI configuration service 404A downloads database records describing fixed microwave links from regulatory database 182 at scheduled times, and determines which, if any, of the licensed links operate near (or within a particular distance of each LPI transmitter location. For example, LPI configuration service 404A may obtain the location of licensed equipment from regulatory database 182, determine a distance between the licensed equipment, and compare the distance to a threshold.

LPI configuration service 404A may then generate a list of frequency channels which are currently used by fixed microwave link operators, and identify those links in the vicinity of the LPI transmitter location that may potentially receive interference if a co-channel is used by a LPI transmitter in its path. LPI configuration service 404A may then evaluate propagation model(s) and evaluate potential interference level(s), and generate a preferred channel list/or non-preferred channel list for each LPI transmitter. LPI configuration service 404A may also determine allowable power levels for each of the frequency channels on the preferred channel list. In general, LPI configuration service 404A may perform any automated frequency coordination task on behalf of LPI transmitters.

Figure 4B:
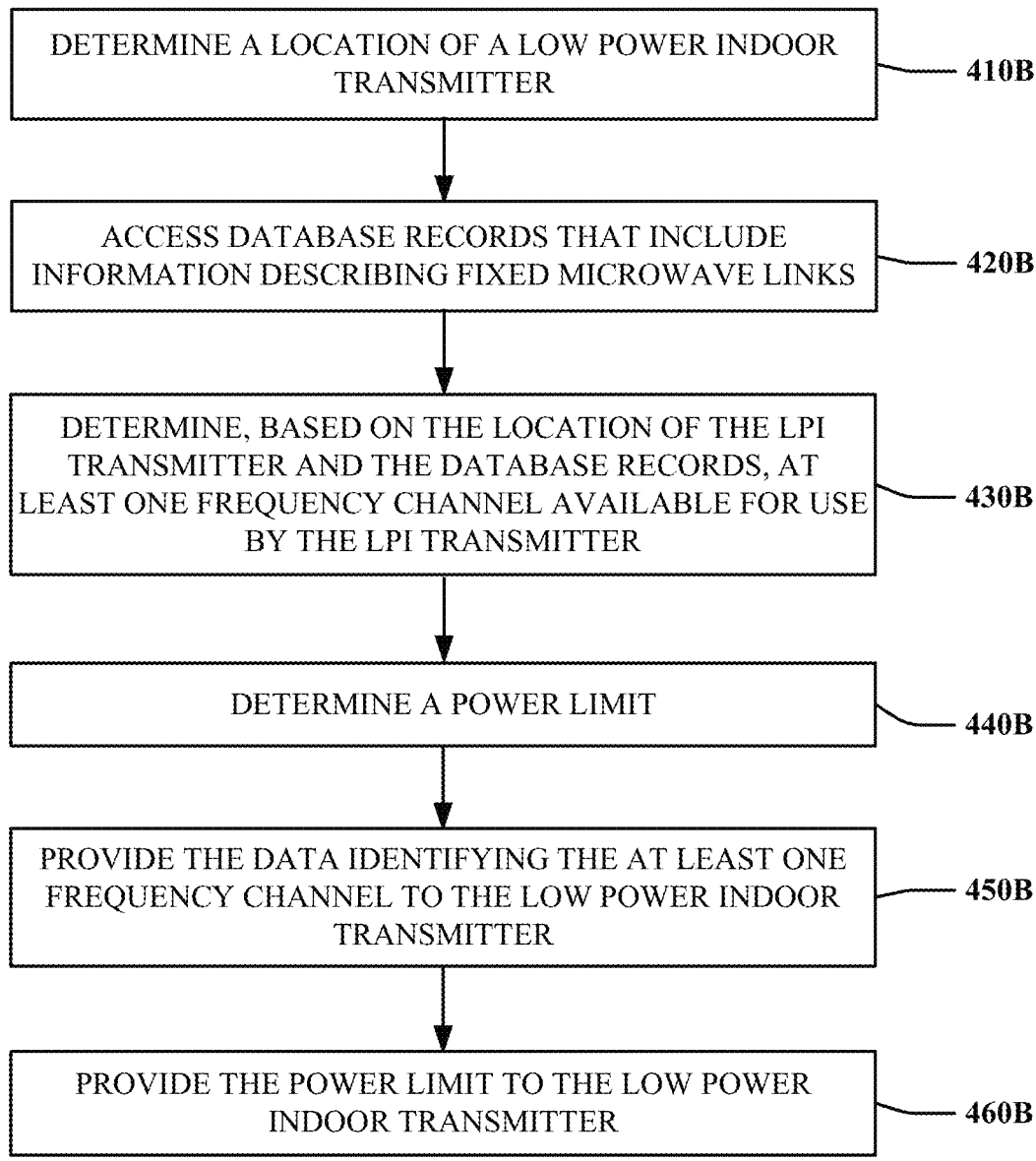
FIG. 4B depicts an illustrative embodiment of a method in accordance with various aspects described herein.

FIG. 4B depicts an illustrative embodiment of a method in accordance with various aspects described herein. At 410B of method 400B, a location of a LPI transmitter is determined. The LPI transmitter may be any transmitter that is considered to be a low power indoor transmitter that uses unlicensed 6 GHz spectrum. Examples include, but are not limited to, LPI indoor Wi-Fi access points, home residential gateways that include an LPI transmitter, 5G small cells that utilize unlicensed 6 GHz spectrum, and the like. In some embodiments, the location of the LPI transmitter location is determined in response to receiving a request from the LPI transmitter. The request may be a request for frequency channel information, power limit information, authentication, provisioning, or any other type of request from an LPI transmitter.

In some embodiments, the location of an LPI transmitter is determined by a LPI configuration service such as LPI configuration service 404A (FIG. 4A). In these embodiments, the location may be determined by accessing location data stored in a broadband customer's user data. For example, a customer record maintained by the broadband service provider may include a home address for the customer, and the home address may be determined to be the location of the LPI transmitter. Also in these embodiments, the location data may be determined using network information such as one or more IP addresses known to the service provider, or may be provided by a broadband customer during registration, provisioning, or authentication of the LPI transmitter. In still further embodiments, the location of the LPI transmitter may be provided by the LPI transmitter itself, or by a device that is collocated with the LPI transmitter. For example, in some embodiments, an LPI transmitter may include the ability to determine its own location (e.g., may include a GPS receiver), or may be in communication with a collocated device that is able to determine location (e.g., a computer or router that includes access to location information).

At 420B, database records that include information describing fixed microwave links are accessed. In some embodiments, this corresponds to LPI configuration service 404A accessing regulatory database 182. In some embodiments, LPI configuration service 404A may access regulatory database 182 on an as-needed basis, and in other embodiments, LPI configuration service 404A may download some or all of the records in the regulatory database periodically, or when notified of a change in the database.

At 430B, at least one frequency channel available for use by one or more LPI transmitters is determined based at least in part on location(s) of LPI transmitter(s) and locations of fixed microwave links and/or locations of licensed equipment. In some embodiments, the location of licensed equipment (e.g., transmitters and/or receivers) operating in the 6 GHz spectrum is compared to locations of LPI transmitters, and the at least one frequency channel is determined based on frequency channels used by licensed equipment within a particular distance (e.g., a distance threshold) of LPI transmitters. Further, in some embodiments, RF propagation models are used to determine if any fixed microwave links might experience interference from one or more LPI transmitters requesting frequency channel information, and the at least one frequency channel is chosen to reduce the possibility of the LPI transmitter causing interference to fixed microwave links. In some embodiments, at 440B, a power limit is also determined. For example, each frequency channel may have a particular power limit associated with it, and LPI configuration service 404A may determine an allowable power limit for LPI transmitters to operate in each of the at least one frequency channels.

At 450B, the data identifying the at least one frequency channel is provided to the LPI transmitter. In some embodiments, at 460B, one or more power limits are also provided to the LPI transmitter. In some embodiments, this corresponds to an LPI configuration service such as LPI configuration service 404A (FIG. 4A) providing the data to one or more home residential gateways 306A (FIG. 4A).

While for purposes of simplicity of explanation, the respective processes are shown and described as a series of blocks in FIG. 4B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5A:
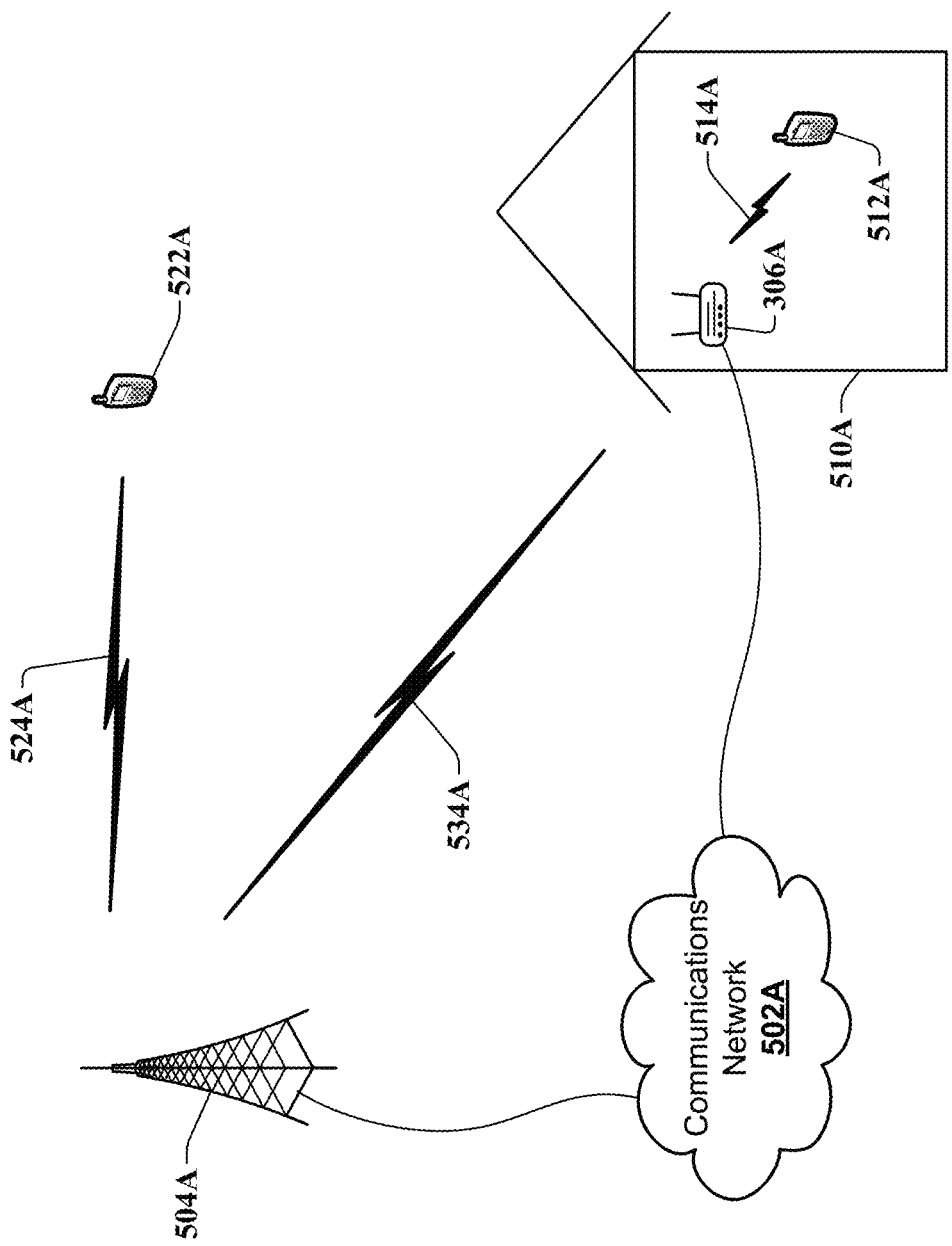
FIG. 5A is a diagram illustrating enhanced Wi-Fi beacon and probe response assisted access point configuration in accordance with various aspects described herein.

FIG. 5A is a diagram illustrating enhanced Wi-Fi beacon and probe response assisted access point configuration in accordance with various aspects described herein. FIG. 5A shows communications network 502A, standard power access point 504A, mobile device 522A, and building 510A. Shown within building 510A are low power indoor access point 306A and mobile device 512A.

Standard power access point 504A operates in unlicensed 6 GHz spectrum, and according to FCC rule, coordinates frequency channel usage by communicating with an AFC system as described above with reference to the previous figures. Standard power access point 504A communicates with mobile device 522A as shown at 524A. In some embodiments, standard power access point 504A periodically transmits Wi-Fi beacons with information describing operations of standard power access point 504A to alert mobile devices of its presence and to allow them to associate with the standard power access point. In various embodiments, standard power access point 504A includes in Wi-Fi beacons frequency channel(s) and power limit(s) information that was received in coordination with an AFC system. In various embodiments, standard power access point 504A includes in Wi-Fi probe responses of frequency channel(s) and power limit(s) information that was received in coordination with an AFC system. In various embodiments, standard power access point 504A also includes in Wi-Fi beacons and probe responses its location information.

Communications network 502A may be any communications network capable of supporting operations of standard power access point 504A. For example, communications network 502A may be communications network 125 (FIG. 1). Communications network 502A also communicates with low power indoor access point 306A. Low power indoor access point 306A communicates with mobile device 512A as shown at 514A.

In some embodiments, low power indoor access point 306A listens for beacons transmitted by standard power access point 504A at 534A. In these embodiments, low power indoor access point 306A may retrieve frequency channel and power limit information provided to standard power access point 504A by an AFC system. In various embodiments, low power indoor access point 306A may utilize the frequency channel(s) and power limit(s) information to set its own operating frequency and power limit in a manner that reduces the possibility of causing interference to incumbent operators in the 6 GHz band. In some embodiments, low power indoor access point 306A may listen for, and receive, beacons from a plurality of standard power access points located in nearby different locations. In these embodiments, low power indoor access point 306A may synthesize the information from multiple standard power access points and, based on frequency channels and power limits included in beacons as well as the locations of the standard power access points transmitting the beacons, determine an operating frequency channel and/or power limit for operations of the low power indoor access point 306A. For example, low power indoor access point 306A may receive beacons from two separate standard power access points, one of which is very close, and one of which is farther away. In this example, low power indoor access point 306A may disregard the frequency channel and/or power limit information included in the beacon transmitted by the standard power access point that is farther away, and utilize only the information included in the beacon transmitted by the standard power access point that is very close. Also for example, low power access point 306A may receive beacons from two standard power access points that are roughly equidistant from low power access 306A. In this example, low power access point 306A may take the intersection of two sets of frequency channels provided in the beacons transmitted by the two standard power access points to determine at least one frequency channel available for use by the low power indoor access point. In various embodiments, the low power access point 306A may take into the considerations of channels and power limits broadcasted by the nearby standard power access point(s) as well as other factors, the measured interference condition in the environment for example, to select an operating channel from one of the received channels through standard power access point beacons of a different channel from the UNII-5, UNII-6, UNII-7, or UNII-8 band (FIG. 2B).

In some embodiments, low power indoor access point 306A may set a power limit for mobile devices that are associated with the low power indoor access point. For example, low power indoor access point 306A may set a power limit for itself and may also set a power limit for a mobile device 512A. The power limit may be inferred from the beacon information transmitted by standard power access point 504A, or may be determined using an algorithm within low power indoor access 306A.

In some embodiments, low power indoor access point 306A may probe one or more standard power access points to retrieve information related to frequency channels available for use by the low power indoor access point. For example, low power indoor access point 306A may probe standard power access point 504A at 534A, and standard power access point 504A may respond with a probe response that includes data identifying one or more frequency channels and/or power limits that standard power access point 504A received in coordination with an AFC system. In various embodiments, low power indoor access point 306A may may probe multiple standard power access points and determine at least one frequency channel available for use by the low power indoor transmitter using the algorithms described above with reference to the frequency channel information being included in beacons.

Figure 5B:
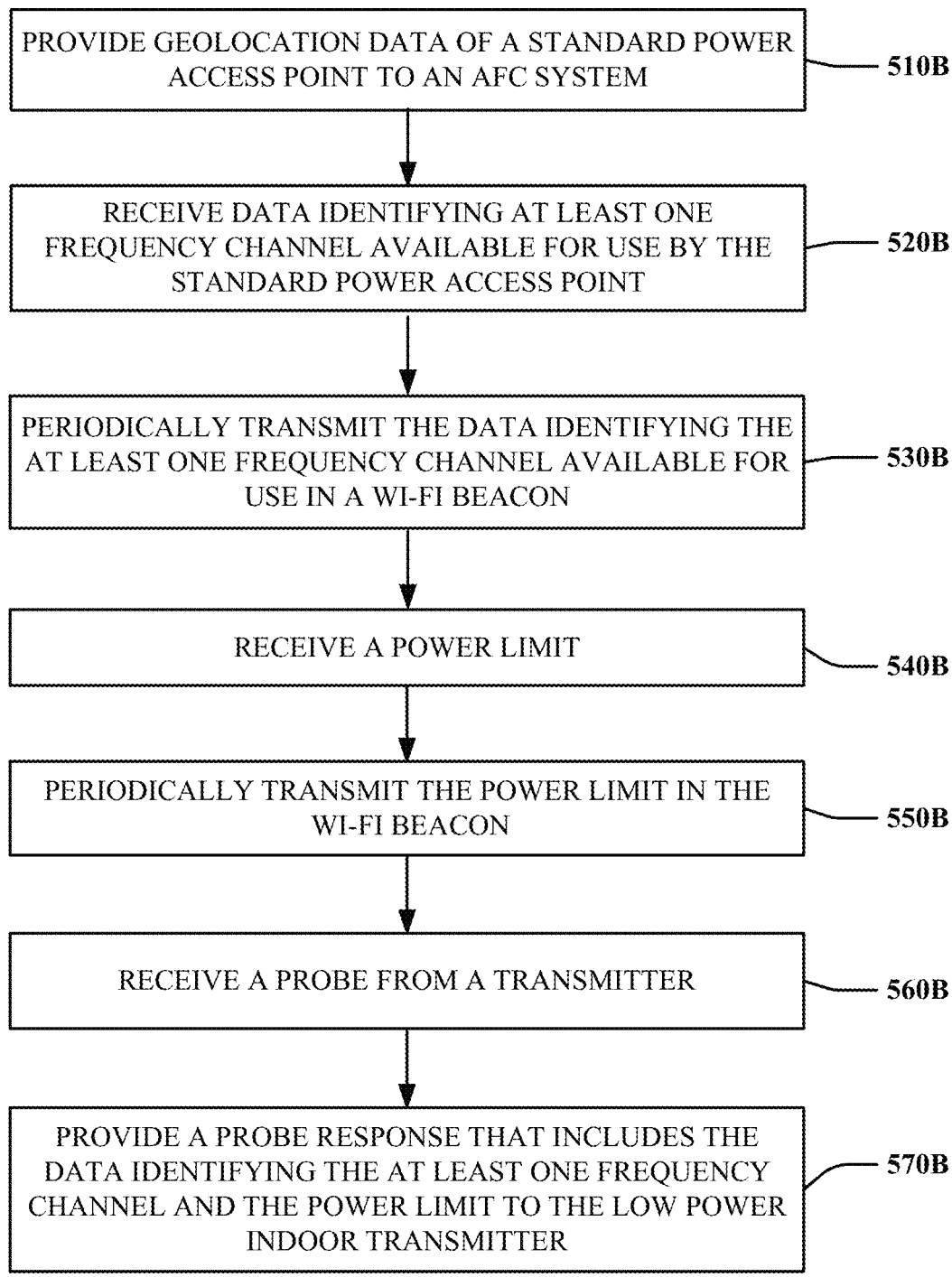
FIGS. 5B and 5C depicts an illustrative embodiment of a method in accordance with various aspects described herein.

FIG. 5B depicts an illustrative embodiment of a method in accordance with various aspects described herein. At 510B of method 500B, geolocation data of a standard power access point, antenna height, FCC ID, device serial number, etc. are provided to an AFC system. In some embodiments, this corresponds to standard power access point 504A (FIG. 5A) providing its location data to an AFC system such as AFC system 180 (FIG. 3A).

At 520B, data identifying at least one frequency channel available for use by the standard power access point is received. In some embodiments, this is in response to an AFC system performing RF propagation modeling for fixed microwave links described in a regulatory database to determine at least one frequency channel that is used by standard power access point 504A will reduce or eliminate the probability of interfering with any incumbent 6 GHz operators.

At 530B, the standard power access point periodically transmits the data identifying the at least one frequency channel available for use in a Wi-Fi beacon. In some embodiments, the standard power access point transmits a list of frequency channels that was previously received by from an AFC system. At 540B, the standard power access point receives a power limit from an AFC system. In some embodiments, this corresponds to a power limit for each frequency channel identified as being available for use by the standard power access point. At 550B, the standard power access point periodically transmits the power limit in the Wi-Fi beacon. In these embodiments, a standard power access point having received frequency channel information and/or power limit information from an AFC system may provide that information to other transmitters by periodically transmitting the information in a Wi-Fi beacon. Any transmitter capable of listening to a Wi-Fi beacon may utilize the information provided by the standard power access point so to help themselves to identify channels that are unlikely to cause interference to incumbent microwave links. For example, a low power indoor transmitter such as a residential gateway or a 5G small cell may listen for Wi-Fi beacons and extract information useful to determine operating frequencies that are likely to reduce the possibility of interference to incumbent 6 GHz links.

In some embodiments, the standard power access point periodically transmits the data identifying the at least one frequency channel that received from AFC in the Wi-Fi beacon. This data is synchronized with the current channel list received from an AFC.

At 560B, a probe is received from a transmitter. In some embodiments, this corresponds to a standard power access point receiving a probe from a device seeking to learn more information about the standard power access point. For example, in some embodiments, this corresponds to receiving a probe from a low power transmitter seeking frequency channel and/or power limit information, and in other embodiments, this may correspond to a client device probing a standard power access point, while not necessarily seeking frequency channel and/or power limit information. At 570B, the standard power access point provides a probe response that includes the data identifying the at least one frequency channel and/or power limits to the low power indoor transmitter. Similar to providing the frequency channel and/or power limit information in a Wi-Fi beacon, providing this information in a probe response allows the standard power access point to share frequency channel and/or power limit information that is likely to aid other transmitters in determining operating parameters that are likely to reduce or eliminate the possibility of interference to incumbent fixed link operators that are licensed and have superior rights to the spectrum in which these devices operate.

While for purposes of simplicity of explanation, the respective processes are shown and described as a series of blocks in FIG. 5B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5C:
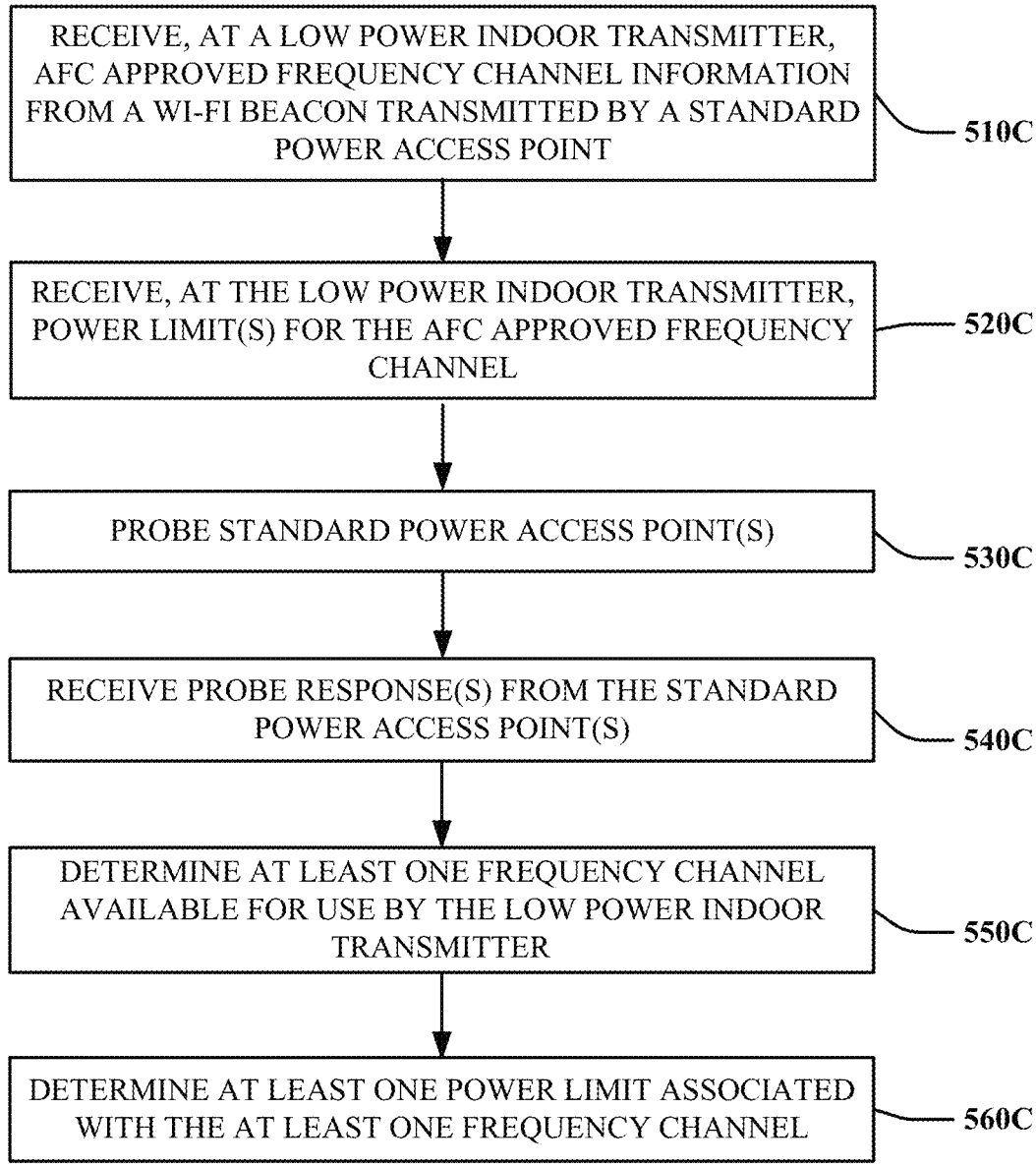

FIG. 5C depicts an illustrative embodiment of a method in accordance with various aspects described herein. At 510C of method 500C, AFC approved frequency channel information is received at a low power indoor transmitter from a Wi-Fi beacon transmitted by a standard power access point. In some embodiments, this corresponds to standard power access point 504A including AFC approved operating frequency information in a Wi-Fi beacon that is then received by low power indoor access point 306A as shown at 534A in FIG. 5A. At 520C, power limits for the AFC approved frequency channels are received at the low power indoor transmitter. In some embodiments, this corresponds to standard power access point 504A including power limits in a Wi-Fi beacon that is then received by low power indoor access point 306A as shown at 534A in FIG. 5A.

In some embodiments, the actions of 510C and/or 520C correspond to a low power indoor access point listening to Wi-Fi beacons from more than one standard power access point. For example, a low power indoor access point may listen for Wi-Fi beacons from any standard power access points within listening range. The low power indoor transmitter may then determine an operating frequency and or power limit based on the lists of AFC approved frequency channels received in the beacons from the plurality of standard power access points.

At 530C, the low power indoor transmitter probes one or more standard power access points to request information regarding operation of the access point and to retrieve AFC approved frequency channels and or power limits. At 540C, the low power indoor transmitter receives one or more probe responses from the standard power access points. The probe responses received from the standard power access points include the AFC approved frequency channels and/or power limits that will allow the low power indoor transmitter to determine an operating frequency and/or power limit that will reduce the likelihood of causing interference to an incumbent 6 GHz operator.

At 550C, the low power indoor transmitter determines at least one frequency channel available for use by the low power indoor transmitter. In some embodiments, this corresponds to receiving data identifying a single frequency channel from a single standard power access point and determining that the single channel is a frequency channel available for use by the low power indoor transmitter. Also in some embodiments, the low power indoor transmitter may receive a list of multiple AFC approved channels from a single standard power access point and may select one of the frequency channels on the list for operation. In still further embodiments, the low power indoor transmitter may receive multiple lists of frequency channels from multiple standard power access points and may then determine an operating frequency channel based on the lists and the locations of the standard power access points. For example, a low power indoor transmitter may give more weight to an AFC approved frequency channel list received from a standard power access point in close proximity as compared to a list of AFC approved frequency channels received from a standard power access point that is farther away. In still further embodiments, a low power indoor transmitter may take the intersection of multiple lists of AFC approved channels received from multiple standard power access points to determine the at least one frequency channel available for use by the low power indoor transmitter.

At 560C, the low power indoor transmitter determines at least one power limit associated with the at least one frequency channel. In some embodiments, the power limits for each frequency channel are provided along with the list of frequency channels by the standard power access points. In these embodiments, determining the at least one power limited associated with the at least one frequency channel may simply involve identifying the power limit associated with the frequency channel. In other embodiments, the low power indoor transmitter may determine a more restrictive power limit for one or more of the at least one frequency channels available for use using any criteria. Identifying the power limit associated with the identified channel also involves checking with FCC power limit rules for LPI operation, making necessary modifications to be sure in compliance to the FCC rules.

While for purposes of simplicity of explanation, the respective processes are shown and described as a series of blocks in FIG. 5C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 6, a block diagram 300 is shown illustrating an example, non-limiting embodiment of a virtualized communication network in accordance with various aspects described herein. In particular a virtualized communication network is presented that can be used to implement some or all of the subsystems and functions of the systems and methods described herein. For example, virtualized communication network 300 can facilitate in whole or in part the configuration of low power indoor access points operating in unlicensed 6 GHz spectrum.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. (shown in FIG. 1). For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 7:
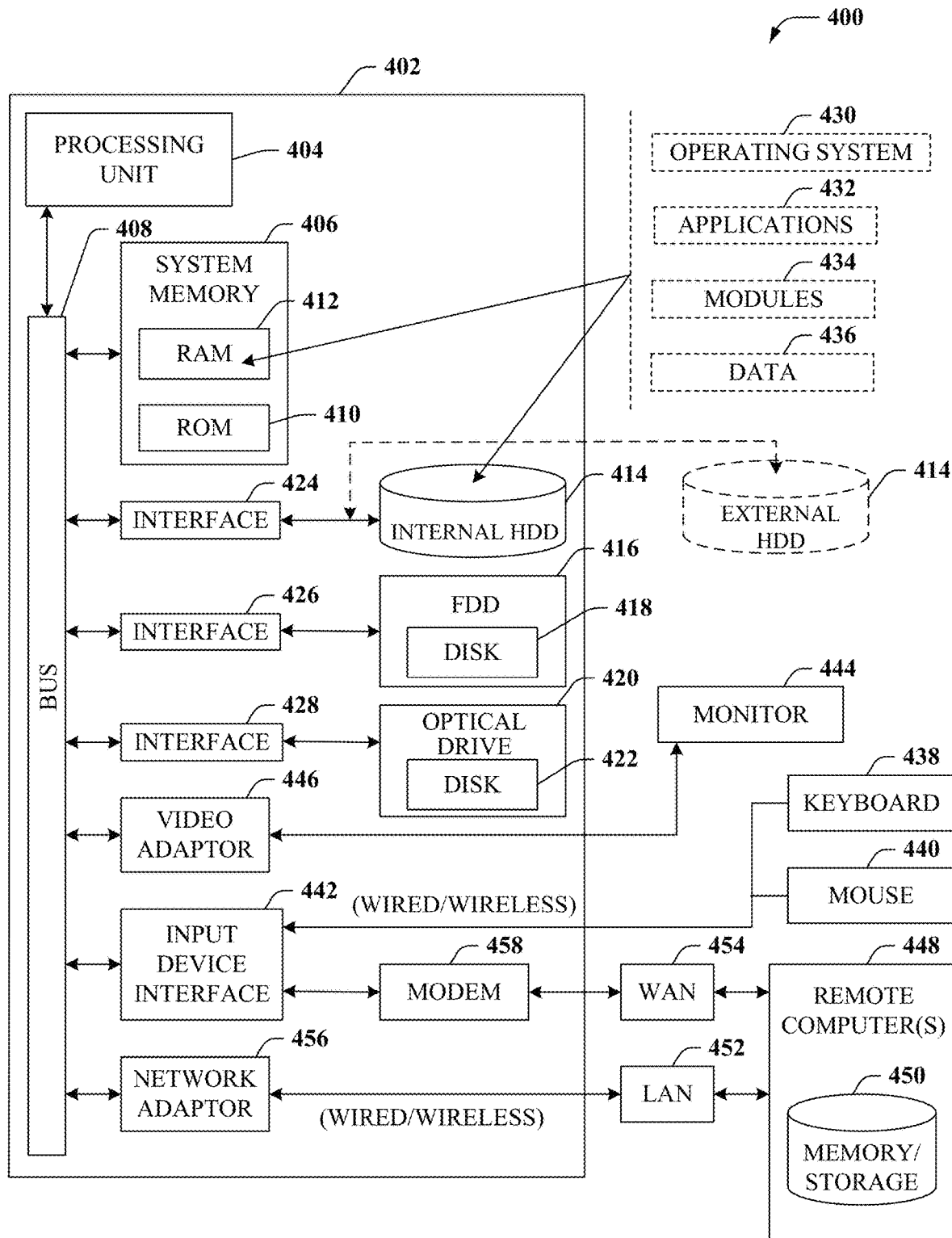
FIG. 7 is a block diagram of an example, non-limiting embodiment of a computing environment in accordance with various aspects described herein.

Turning now to FIG. 7, there is illustrated a block diagram of a computing environment in accordance with various aspects described herein. In order to provide additional context for various embodiments of the embodiments described herein, FIG. 7 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the configuration services of low power indoor access points operating in unlicensed 6 GHz spectrum, AFC Proxy functions, etc.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 7, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ax, be etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4, 5 and 6 GHz radio bands for example or with products that contain all three bands, any of these three bands or just one band so the networks can provide real-world performance similar to the basic 10BaseT or 100BaseT wired Ethernet networks used in many offices.

Figure 8:
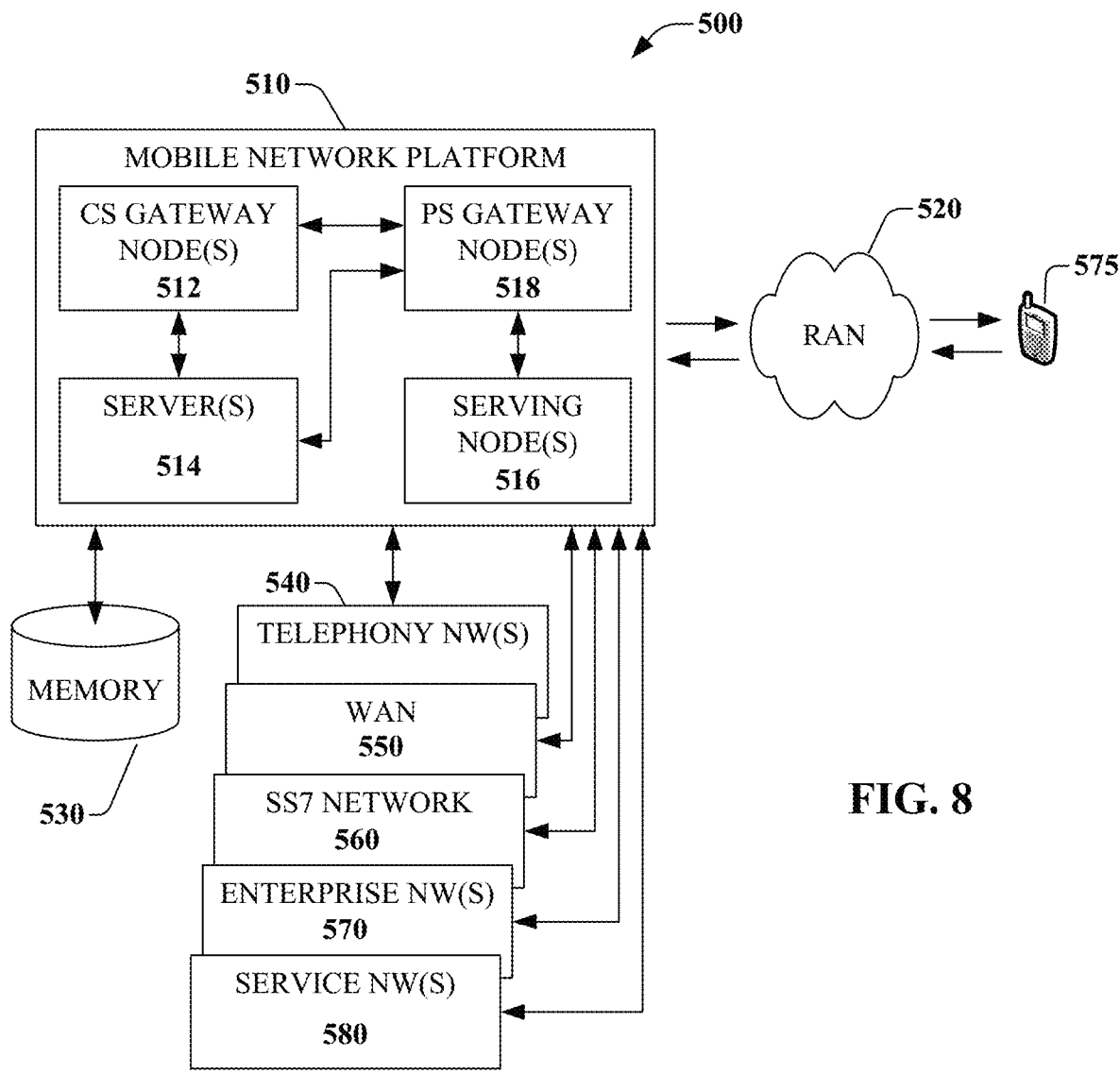
FIG. 8 is a block diagram of an example, non-limiting embodiment of a mobile network platform in accordance with various aspects described herein.

Turning now to FIG. 8, an embodiment 500 of a mobile network platform 510 is shown that is an example of network elements 150, 152, 154, 156, and/or VNEs 330, 332, 334, etc. For example, platform 510 can facilitate in whole or in part the configuration of low power indoor access points operating in unlicensed 6 GHz spectrum. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575. Mobile Network Platform may also include LTE, 5G and future 6G network platforms which may also include 6 GHz unlicensed transmitters.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 9:
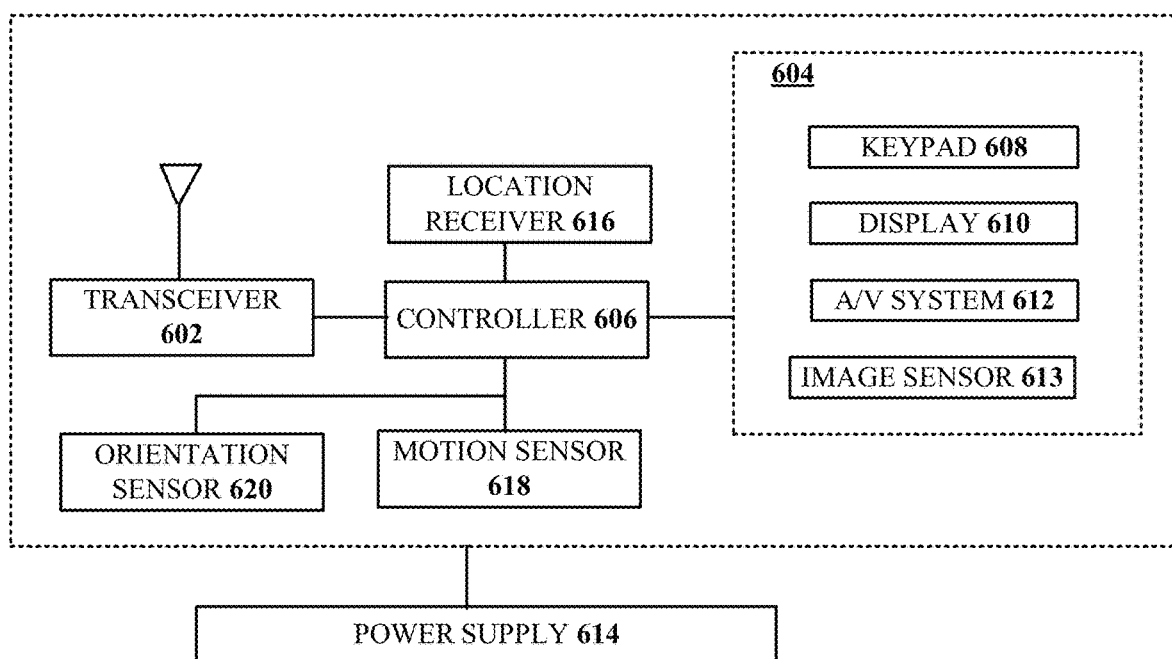
FIG. 9 is a block diagram of an example, non-limiting embodiment of a communication device in accordance with various aspects described herein.

Turning now to FIG. 9, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part the configuration of low power indoor access points operating in unlicensed 6 GHz spectrum. For example the communication device 600 can be a Wi-Fi AP that has 2.4, 5 and/or 6 GHz transceivers. For example the communication device 600 can also be a Wi-Fi client device that has 2.4, 5 and/or 6 GHz transceivers.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, or cellular communication technologies, just to mention a few (Bluetooth® is a trademark registered by the Bluetooth® Special Interest Group). Cellular technologies can include, for example, CDMA-1×, UMTS/HSDPA, GSM, LTE, 5G as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 9 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "client device," "user terminal," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising a first access point, the device comprising:
   a processing system including a processor; and
   a memory that stores executable instructions that, when executed by the processing system, facilitate performance of operations, the operations comprising:
   providing geolocation data of the device to an automated frequency coordination (AFC) system;
   receiving, at the device, data identifying at least one frequency channel available for use by the device; and
   periodically transmitting, by the device, the data identifying the at least one frequency channel in a Wi-Fi beacon configured to be received at a low power indoor transmitter physically separate from the AFC system.

2. The device of claim 1, wherein the operations further comprise:
   receiving a probe from the low power indoor transmitter; and
   providing a probe response to the low power indoor transmitter, wherein the probe response includes the data identifying the at least one frequency channel.

3. The device of claim 2, wherein the low power indoor transmitter comprises a residential gateway.

4. The device of claim 3, wherein the residential gateway includes a Wi-Fi access point.

5. The device of claim 3, wherein the residential gateway includes a 5G small cell.

6. The device of claim 1, wherein the device operates using unlicensed spectrum in a 6 GHz band, and the at least one frequency channel comprises a list of frequency channels to reduce a possibility of interference to licensed operators using the 6 GHz band.

7. The device of claim 1, wherein the operations further comprise:
   receiving a power limit from the AFC system; and
   transmitting the power limit in the Wi-Fi beacon.

8. The device of claim 7, wherein:
   the receiving the power limit comprises receiving a power limit for each of the at least one frequency channel available for use; and
   the transmitting the power limit in the Wi-Fi beacon comprises transmitting the power limit for each of the at least one frequency channel available for use in the Wi-Fi beacon.

9. The device of claim 1, wherein the receiving the data identifying the at least one frequency channel available for use comprises receiving data identifying a plurality of frequency channels available for use.

10. The device of claim 9, wherein the periodically transmitting the data identifying the at least one frequency channel in the Wi-Fi beacon comprises transmitting the data identifying the plurality of frequency channels in the Wi-Fi beacon.

11. A non-transitory machine-readable medium, comprising executable instructions that, when executed by a processing system including a processor, facilitate performance of operations, the operations comprising:
   providing geolocation data of a standard power access point to an automated frequency coordination (AFC) system;

receiving, at the standard power access point, data identifying at least one frequency channel available for use by the standard power access point; and periodically transmitting, by the standard power access point, the data identifying the at least one frequency channel in a Wi-Fi beacon configured to be received at a low power indoor transmitter physically separate from the AFC system.

12. The non-transitory machine-readable medium of claim 11, wherein the operations further comprise:

receiving a probe from athe low power indoor transmitter; and providing a probe response to the low power indoor transmitter, wherein the probe response includes the data identifying the at least one frequency channel.

13. The non-transitory machine-readable medium of claim 12, wherein the low power indoor transmitter comprises a residential gateway.

14. The non-transitory machine-readable medium of claim 13, wherein the residential gateway includes a Wi-Fi access point.

15. The non-transitory machine-readable medium of claim 13, wherein the residential gateway includes a 5G small cell.

16. The non-transitory machine-readable medium of claim 11, wherein the standard power access point operates using unlicensed spectrum in a 6 GHz band, and the at least one frequency channel comprises a list of frequency channels to reduce a possibility of interference to licensed operators using the 6 GHz band.

17. A method, comprising:

providing, by a standard power access point including a processor, geolocation data of the standard power access point to an automated frequency coordination (AFC) system;

receiving, by the standard power access point, data identifying at least one frequency channel available for use by the standard power access point; and periodically transmitting, by the standard power access point, the data identifying the at least one frequency channel in a Wi-Fi beacon configured to be received at a low power indoor transmitter physically separate from the AFC system.

18. The method of claim 17, further comprising:

receiving, by the standard power access point, a power limit from the AFC system; and transmitting, by the standard power access point, the power limit in the Wi-Fi beacon.

19. The method of claim 18, wherein:

the receiving the power limit comprises receiving a power limit for each of the at least one frequency channel available for use; and the transmitting the power limit in the Wi-Fi beacon comprises transmitting the power limit for each of the at least one frequency channel available for use in the Wi-Fi beacon.

20. The method of claim 17, wherein:

the receiving the data identifying the at least one frequency channel available for use comprises receiving data identifying a plurality of frequency channels available for use; and the periodically transmitting the data identifying the at least one frequency channel in the Wi-Fi beacon comprises transmitting the data identifying the plurality of frequency channels in the Wi-Fi beacon.

* * * * *